United States Patent [19]

Ray

[11] Patent Number: 4,678,760

[45] Date of Patent: Jul. 7, 1987

[54] METHOD OF FORMING A SUBSTANTIALLY INTERWOVEN MATRIX CONTAINING A REFRACTORY HARD METAL AND A METAL COMPOUND

[75] Inventor: Siba P. Ray, Plum Boro, Pa.

[73] Assignee: Aluminum Company of America, Pittsburgh, Pa.

[21] Appl. No.: 789,435

[22] Filed: Oct. 21, 1985

Related U.S. Application Data

[63] Continuation-in-part of Ser. No. 604,913, Apr. 27, 1984, which is a continuation-in-part of Ser. No. 423,673, Sep. 27, 1982, Pat. No. 4,454,015.

[51] Int. Cl.$^4$ .............. C04B 35/00; C04B 35/58; C04B 35/10; C04B 35/46
[52] U.S. Cl. .................................. 501/96; 501/87; 501/88; 501/92; 501/97; 501/98; 501/103; 501/108; 501/127; 204/157.45; 204/157.46; 204/157.47; 204/457.49; 204/291; 204/292; 204/293
[58] Field of Search ................ 501/87, 88, 92, 96, 501/97, 98, 103, 108, 127; 204/157.45, 157.46, 157.47, 157.49, 291, 292, 293

[56] References Cited

U.S. PATENT DOCUMENTS

| | | | |
|---|---|---|---|
| 3,143,413 | 8/1964 | Krapf | 501/87 |
| 4,500,643 | 2/1985 | Gesing et al. | 204/67 |
| 4,514,355 | 4/1985 | Montgomery | 501/96 |
| 4,528,121 | 7/1985 | Matsushitz et al. | 501/96 |
| 4,540,475 | 9/1985 | DeAngolis | 501/96 |

*Primary Examiner*—Mark L. Bell
*Attorney, Agent, or Firm*—Andrew Alexander; John P. Taylor

[57] ABSTRACT

The invention discloses an improvement in a process wherein a first reactant comprising one or more metals or metal compounds exothermically reacts with a second reactant comprising at least one or more metals or metal compounds in the presence of a third reactant to form an interwoven matrix of a conductive material and an insulating material. The improvement comprises locally applying, to a selected region of a shaped body formed from a mixture of the reactants, sufficient energy to initiate an exothermic reaction which then propagates throughout the remainder of the body to form the interwoven matrix.

23 Claims, 15 Drawing Figures

TiB$_2$ – Al$_2$O$_3$ RUN 1 SAMPLE 1
AREA WITH HIGH DARK PHASE
600X

FIG. 4

MIDDLE

METHOD OF FORMING A SUBSTANTIALLY INTERWOVEN MATRIX CONTAINING A REFRACTORY HARD METAL AND A METAL COMPOUND

CROSS REFERENCE TO RELATED APPLICATIONS

This application is a Continuation-In-Part of application Ser. No. 604,913 filed Apr. 27, 1984, which is a Continuation-In-Part of application Ser. No. 423,673, filed Sept. 27, 1982, and now issued as U.S. Pat. No. 4,454,015 on June 12, 1984.

BACKGROUND OF THE INVENTION

1. Field of the Invention

This invention relates to an improved method for the formation of a substantially interwoven matrix containing refractory hard metal. More particularly, this invention relates to an improved method of forming a substantially interwoven matrix containing a refractory hard metal with little or no external heat input. The resultant product is subject to less distortion during formation, thus rendering it more suitable to applications, such as a cathode for a reduction cell for the electrolytic production of metal, such as aluminum.

2. Description of the Prior Art

Refractory hard metals, such as $TiB_2$ or $ZrB_2$ are useful in applications where a material is needed possessing both mechanical strength and chemical inertness, particularly at elevated temperatures. Such uses include use as an electrode, e.g., a cathode, in an electrolytic reduction cell for the production of metal, such as aluminum.

When aluminum is produced in a Hall cell, for example, a certain amount of carbon is consumed from the electrodes per pound of aluminum produced. In Hall cells, often the cathode is fabricated from carbon or graphite, and in a typical Hall cell, the cathode is covered with a layer of aluminum. The layer of aluminum is maintained on the cathode for several reasons. First, aluminum reacts with the carbon cathode to a certain extent to form a thin layer of aluminum carbide on the cathode. The aluminum carbide layer, upon exposure to the bath, e.g., cryolite, dissolves. The exposure can occur as a result of magnetic currents in the cell moving the aluminum layer leaving the aluminum carbide exposed to the bath. Thus, to minimize replacement of the carbon cathode, sufficient aluminum is permitted to remain on the cathode to prevent such wear. In addition, because of the molten metal movement as a result of the magnetic currents, the anode-cathode distance in the cell cannot be minimized since such can result in short-circuiting of the cell. Thus, it can be seen that normally such a cell is operated at less than its optimum efficiency because a larger anode-cathode distance has to be used.

In the prior art, many attempts have been made to overcome this problem of having an excessive anode-cathode distance. For example, it has been recognized that when $TiB_2$ is used as a cathode surface, aluminum may be drained from the cathode surface without attack by the bath on the cathode. This, in turn, permits much closer anode-cathode distance without fear of short circuiting. However, the use of $TiB_2$ having the high level of purity required in such an application has provided to be very expensive. If inferior grades are used, this results in cracking of the $TiB_2$ and the attendant problems therewith. Of course, it will be recognized that one of the advantages of the use of refractory hard metals, such as titanium diboride, as a cathode surface resides in the fact that the $TiB_2$ surface is readily wettable by liquid metal, e.g., liquid aluminum. This result permits the cathode surface to be drained of the liquid metal and eliminates the electromagnetic problems encountered with a deeper or thicker aluminum pool. This, in turn, permits the use of a smaller anode-cathode distance with a distinct advantage in power efficiency.

However, as noted earlier, special controls often are used to preclude failures in the use of refractory hard metals, e.g., $TiB_2$, in these environments, such as, for example, set forth in U.S. Pat. Nos. 4,308,113 and 4,308,114. Also, U.S. Pat. No. 4,376,029 illustrates another attempt at using $TiB_2$ as a cathode by using a $TiB_2$-carbon composite. One benefit disclosed for this composite is the fact that a cheaper grade of $TiB_2$ may be used thereby lowering the overall cost of the cathode.

The interest in the use of $TiB_2$ as an electrode or electrode surface for an electrolytic cell generated great interest in ways to economically produce such product in a form that could be used as a cathode. For example, U.S. Pat. No. 4,353,885 discloses forming $TiB_2$ by vapor phase reaction. Additionally, U.S. Pat. No. 3,016,288 discloses an aluminothermic process of making boron compounds and alloys.

Merzhanov et al U.S. Pat. No. 3,726,643 describes the use of ignition means to react group IV, V, and VI metals with N, C, Si, $O_2$, P, S, F, or $Cl_2$ which comprises using an electric coil to ignite an ignition composition or agent. The ignition composition comprises Ca $Si_2$, $Fe_2O_3$, Mg, $Al_2O_3$, $SiO_2$, Ti, and B and is prepared from five mixtures of some of the ingredients which are then pressed together and ignited. The patentees describe the production of titanium diboride by mixing the ignition composition with metallic titanium and boron and then igniting the mixture.

J. Birch Holt in "Exothermic Process Yields Refractory Nitride Materials", published in *Industrial Research and Development,* April 1983, at pp. 88–91, describes an exothermic process for producing refractory metal nitrides such as TiN from titanium metal powder mixed with $NaN_3$ and then ignited with an electric coil. In the article it is stated that this process, which takes advantage of the high heat formation of many compounds, and has been designated the Self-Propagating High-Temperature Synthesis (SHS), has been used to form borides, carbides, hydrides, silicides, nitrides, and other compounds of many different metals.

Yet, in spite of all this work, the use of $TiB_2$ cathodes in electrolytic cells finds extremely limited use. One factor which limits its use is the high cost. Thus, in order to obtain the benefits of such a material, it can be seen that there is a great need for a process which would provide $TiB_2$ or a material having properties similar to $TiB_2$ at an economically feasible cost.

In my parent U.S. patent application Ser. No. 604,913, there is disclosed a novel composition in which a refractory hard metal, such as $TiB_2$, is formed in an interwoven matrix with a metal compound by a displacement reaction. This invention relates to improvements in the method of making such a substantially interwoven matrix composition.

SUMMARY OF THE INVENTION

It is, therefore, an object of the present invention to provide an improved method for making a substantially interwoven matrix material containing a refractory hard metal.

It is another object of the present invention to provide an improved method for making a substantially interwoven matrix material containing a refractory hard metal suitable for use as an electrode in an electrolytic cell for the production of a metal from a metal oxide or other compound dissolved in a molten solvent bath.

It is yet another object of the present invention to provide an improved method for making a substantially interwoven matrix material containing a refractory hard metal suitable for use as a cathode in an electrolytic cell for the production of aluminum from an aluminum containing material dissolved in a molten solvent bath.

It is a further object of the present invention to provide an improved method for making a substantially interwoven matrix material comprising a refractory hard metal and a metal compound by a displacement reaction.

It is yet a further object of the present invention to provide an improved method for making a substantially interwoven matrix material comprising a refractory hard metal and a metal compound by a displacement reaction which is initiated by locally applying energy to suitable reactants to initiate the reaction.

In accordance with these objects, there is provided a method for making a substantially interwoven matrix material which comprises forming a body containing first and second reactants capable of reacting to form a refractory hard metal and a third reactant capable of oxidizing to form a metal compound; and locally applying energy to a first region of the body to initiate a reaction which propagates throughout the remainder of the body to thereby form the interwoven matrix material.

DETAILED DESCRIPTION OF THE INVENTION

The invention provides a method for making an electrode composition suitable for use in the production of metals, such as aluminum, by electrolytic reduction of their oxides or salts in a molten salt bath. The electrode composition, made by the method of the invention, is essentially inert to attack by molten metal while providing a high level of electrical conductivity.

The electrode composition made in accordance with the present invention is particularly suited for use as a cathode in an aluminum producing cell. In one preferred aspect, the composition, formed by the method of the invention, is particularly useful as a cathode for a Hall cell in the production of aluminum. That is, when a composition formed by the method of the invention is used as a cathode, it has been found to have very high resistance to molten metal, e.g., aluminum deposited on the cathode of a Hall cell. Additionally, the composition has been found to be compatible with typical electrolytes used in producing aluminum, such as cryolite ($Na_3AlF_6$) type electrolyte baths when operated at temperatures around 950° to 1000° C.

Typically, such baths can have a weight ratio of NaF to $AlF_3$ in a range of about 1.0:1 to 1.4:1. Also, an electrode, formed from a composition made in accordance with the invention, has been found to be compatible with lower temperature cryolite type baths where the NaF/$AlF_3$ ratio can be in the range of from 0.5 up to 1.1:1. Low temperature baths may be operated typically at temperatures of about 800° to 850° C. utilizing the electrode composition of the invention. While such baths may consist only of $Al_2O_3$, NaF, and $AlF_3$, it is possible to provide in the bath at least one halide compound of the alkali and alkaline earth metals (other than sodium) in an amount effective for reducing the operating temperature. Suitable alkali and alkaline earth metal halides are LiF, $CaF_2$, and $MgF_2$. In one embodiment, the bath can contain LiF in an amount between 1 and 15%.

Figure 1:
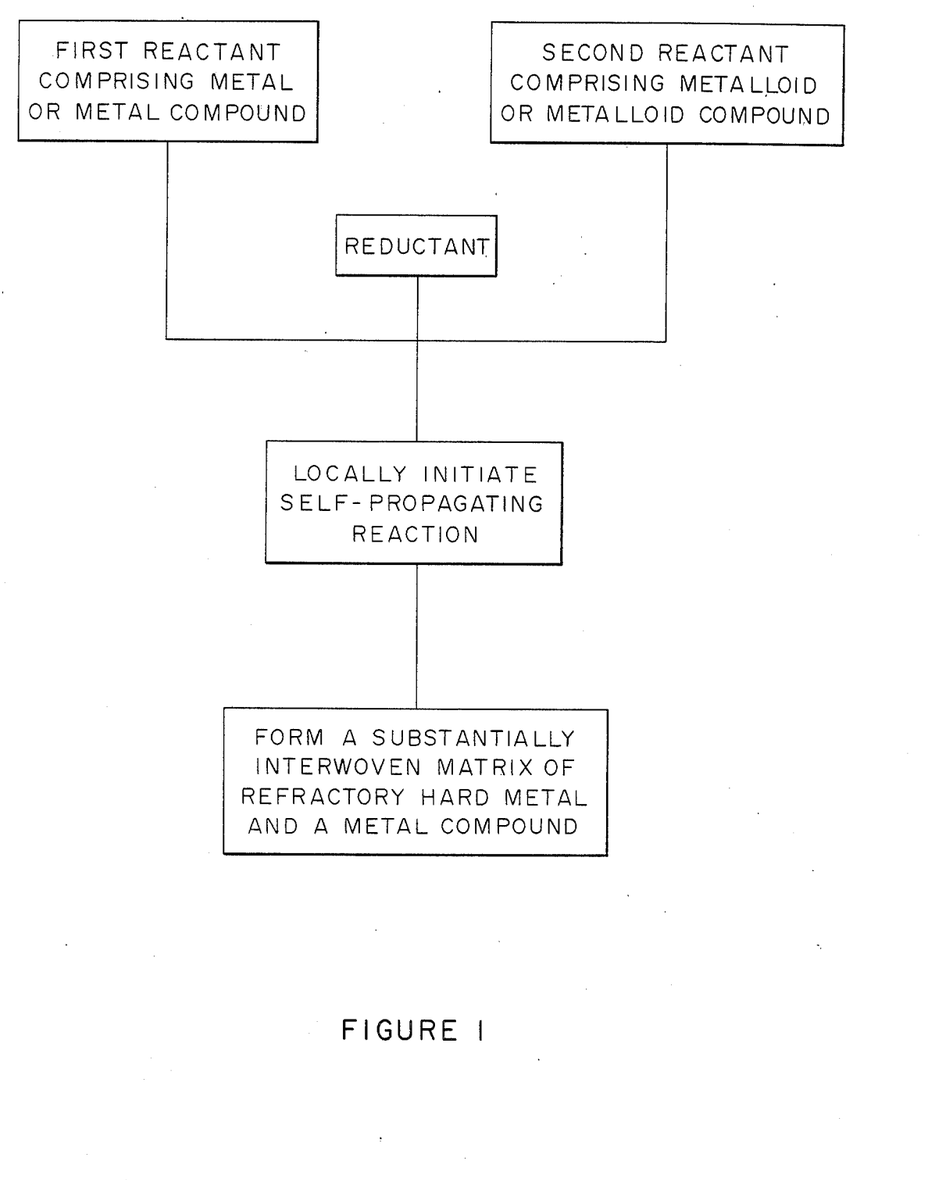
FIG. 1 is a flowsheet illustrating the process of the invention to form the interwoven reaction product.
Figure 2:
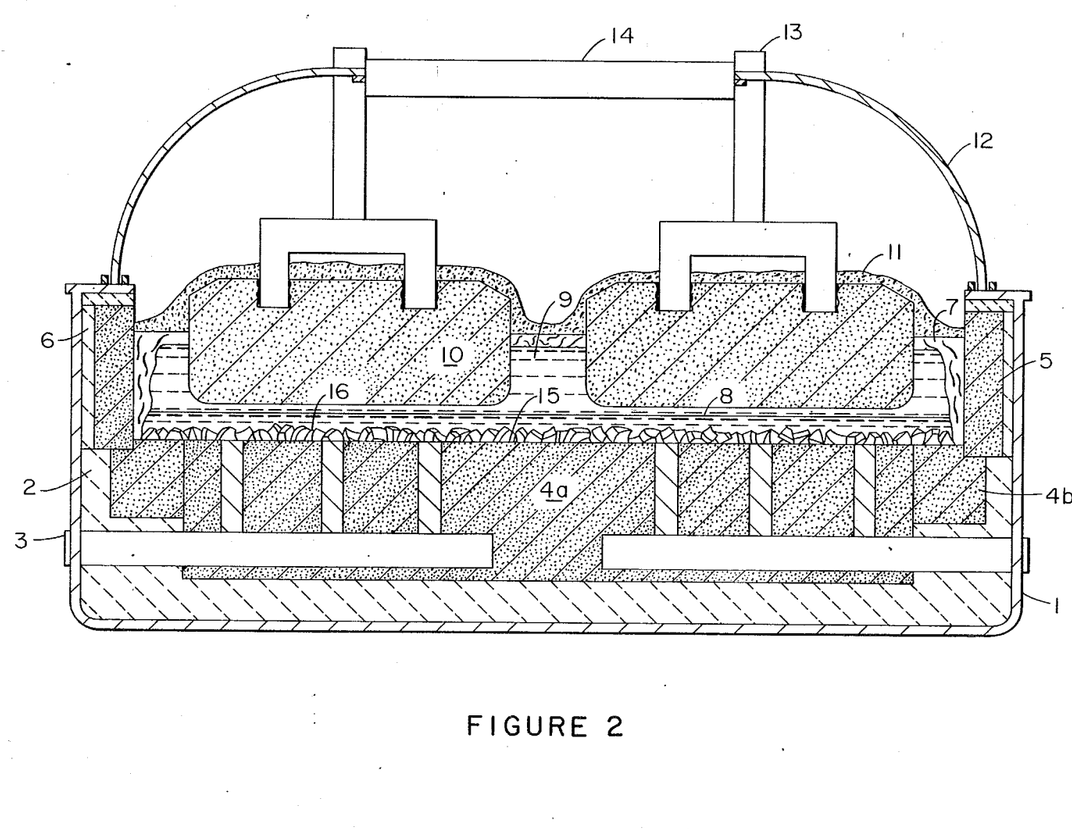
FIG. 2 is a schematic representation of an electrolytic cell showing one form in which the interwoven matrix product can be used.
Figure 3:
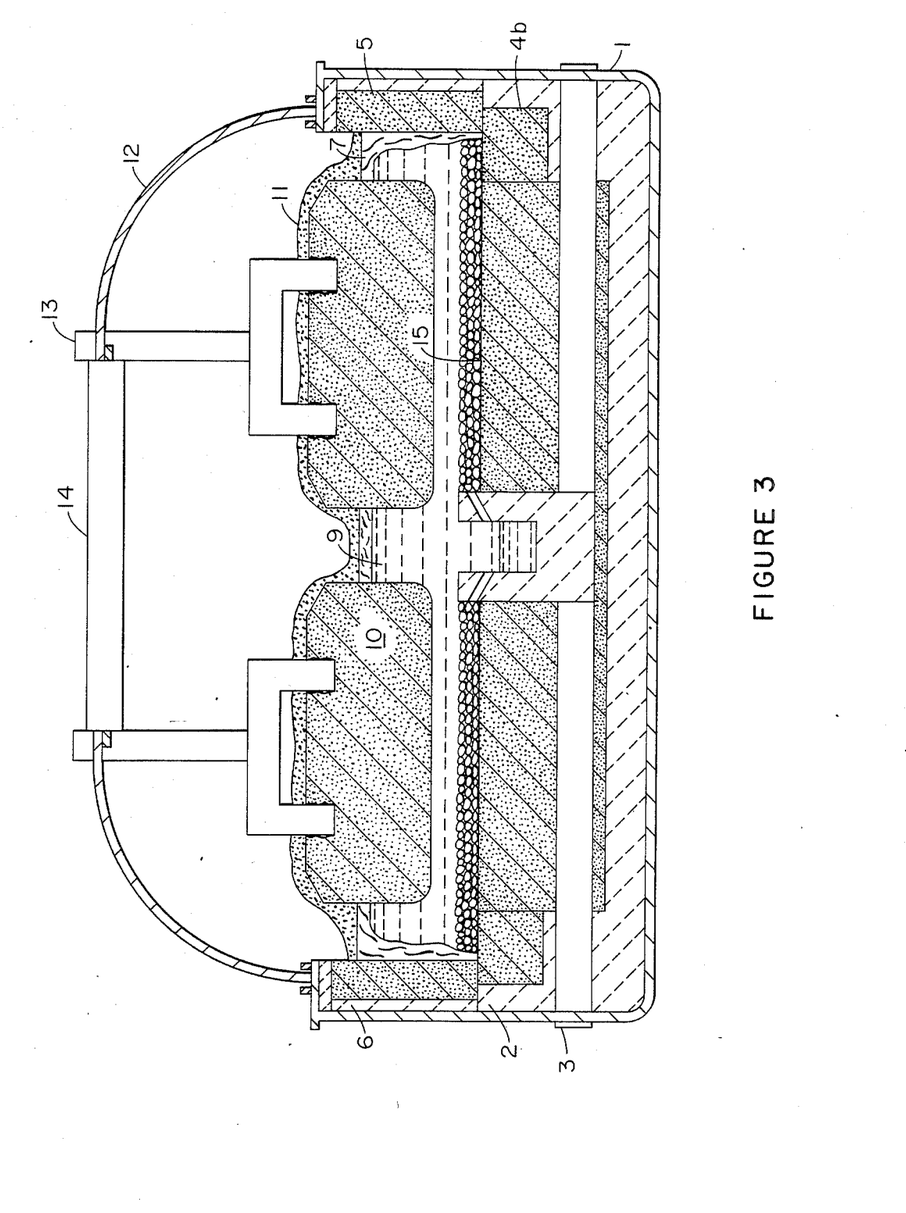
FIG. 3 is a second schematic representation of an electrolytic cell showing another form in which the interwoven matrix product be used.

Cells of the type in which a cathode, formed from compositions made in accordance with the invention, may be used are shown in FIGS. 2 and 3. Accordingly, there is illustrated in FIGS. 2 and 3 a Hall Heroult cell for producing aluminum, including as conventional features a steel shell 1, thermal insulation 2, electrical current collector bars 3, carbon lining 4a, 4b, carbon blocks 5, thermal insulation 6, frozen bath (or, more succinctly, "freeze") 7, molten aluminum 8 (FIG. 2), molten bath 9, carbon anodes 10, alumina 11, removable covers 12, anode rods 13, and superstructure 14. The foot portions of the covers 12 are provided with appropriate electrical barriers, so that the covers cannot act as a route for short-circuiting the electrical current around the electrolysis zone.

Electrolysis takes place by virtue of direct current electrical power, the positive connection being to the anode rods, the negative connection being to the collector bars. Anodic surface area is provided by the portions of the anodes submerged in the molten bath, while cathodic surface area is provided by the molten aluminum 8 (FIG. 2), which is cathodic by virtue of its resting on the electrically conductive carbon lining 4a creating an electrical current flow path to the collector bars 3. It will be observed that the molten aluminum 8 represents a cathodic body of liquid occupying a region such that it is possible for waves in such body to touch anodic surface area. It can be sensed when waves are indeed touching anodic surface area, because when the anode is lowered too close to the molten aluminum, one begins to find erratic fluctuations in the measured electrical parameters (e.g., voltage) of the cell, and current efficiency, i.e., the percent of electrical current actually resulting in aluminum production, falls.

The novel composition suitable for cathode use is formed by reacting together a first reactant and a second reactant in the presence of a third reactant to provide a reaction wherein the reactants combine to form a substantially interwoven matrix of a conductive material and an insulating material. In a preferred embodiment, the first reactant is a metal or a metal compound; the second reactant is a metal or a metal compound; and the third reactant is a material capable of being oxidized. In a particularly preferred embodiment, the first reactant is a metal or a metal compound; the second reactant is a metalloid or a compound formed from a metalloid; and the third reactant is a reductant such that the reactants form a substantially interwoven matrix of a refractory hard metal and a metal compound. The term "metalloid" is herein defined to include boron, nitrogen, carbon, silicon, and sulfur.

The first reactant is preferably selected from the class consisting of a metal; and oxides, carbides, nitrides, and silicides of metals. The second reactant is typified by silicon, boron, carbon, nitrogen, and the like or their compounds, e.g., oxides of silicon and boron and nitrides of sodium and potassium. The third reactant is preferably selected from Al, Mg, Ca, Ba, and the like. In accordance with a preferred embodiment of the invention, the metal compound, e.g., metal oxide, resulting from the reaction is dispersed throughout the refractory hard metal thereby forming a substantially interwoven matrix with the refractory hard metal resulting in a composition having a high level of conductivity.

The metals or metal compound reactants useful in the invention include those metals and metal compounds which react to form or provide a refractory hard metal dispersed through the reaction product with other compounds resulting from the reaction. In a particularly preferred embodiment of the invention in which a titanium diboride or zirconium diboride refractory hard metal is interwoven with aluminum oxide, the reactants can comprise metallic titanium or zirconium, TiO, ZrO, TiO$_2$, or ZrO$_2$; and boron oxide in the presence of aluminum. The reactions are illustrated as follows:

$$Ti + B_2O_3 + 2Al \rightarrow TiB_2 + Al_2O_3$$

$$TiO + B_2O_3 + 8/3Al \rightarrow TiB_2 + 4/3Al_2O_3$$

$$TiO_2 + B_2O_3 + 10/3Al \rightarrow TiB_2 + 5/3Al_2O_3$$

$$Zr + B_2O_3 + 2Al \rightarrow ZrB_2 + Al_2O_3$$

$$ZrO + B_2O_3 + 8/3Al \rightarrow ZrB_2 + 4/3Al_2O_3$$

$$ZrO_2 + B_2O_3 + 10/3Al \rightarrow ZrB_2 + 5/3Al_2O_3$$

While such reactions are illustrated in stoichiometrically balanced equations which provide stoichiometrically balanced compounds, it will be understood that the use of non-stoichiometric compounds are contemplated within the purview of the invention. Further, the ratio of TiB$_2$ or ZrB$_2$ to Al$_2$O$_3$ in the interwoven matrix product can be varied, as will be noted herein, and such is also contemplated within the invention.

The term "refractory hard metal", as used herein, is intended to define compounds, such as metal nitrides, borides, carbides, silicides, or sulfides, or their mixtures, formed by reacting a metalloid, or a metalloid compound, with a refractory metal or a refractory metal compound, such as, for example, titanium, zirconium, hafnium, chromium, titanium oxide, zirconium oxide, etc.

Figure 4:
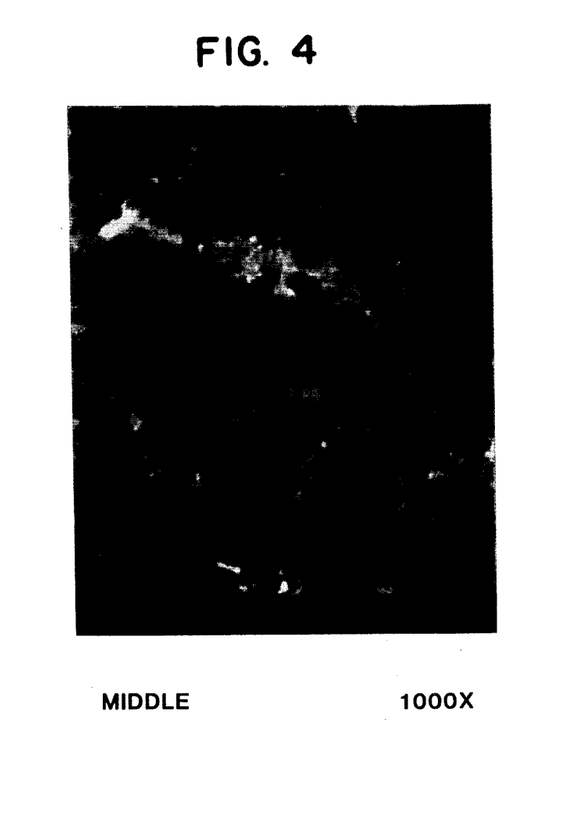
FIG. 4 is a backscattered electron image at 100× of the interwoven matrix comprised of $TiB_2$ and $Al_2O_3$ in accordance with the invention.
Figure 5:
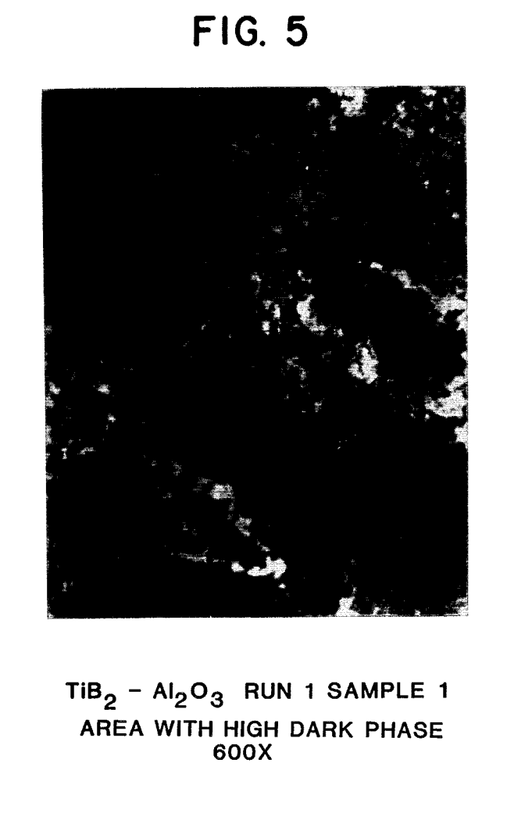
FIG. 5 is a photomicrograph at 600× of the interwoven matrix comprised of $TiB_2$ and $Al_2O_3$ in accordance with the invention.
Figure 6:
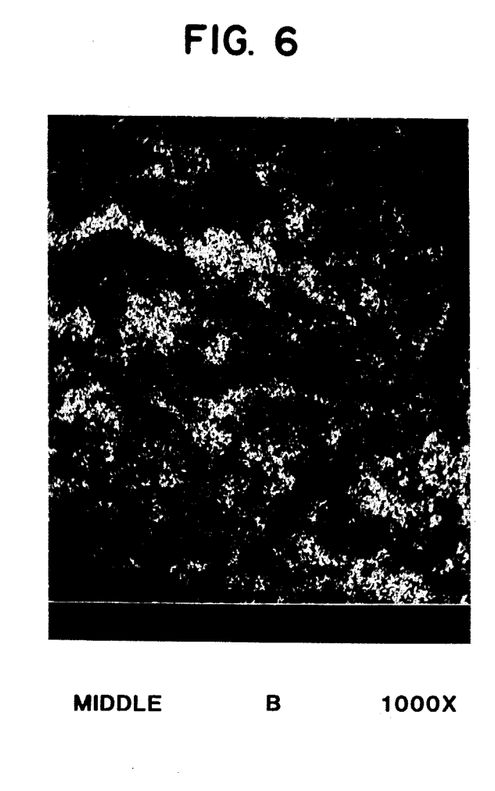
FIG. 6 is an x-ray map corresponding to FIG. 4 at 1000× of a $TiB_2$-$Al_2O_3$ interwoven matrix showing the boron concentrations.
Figure 7:
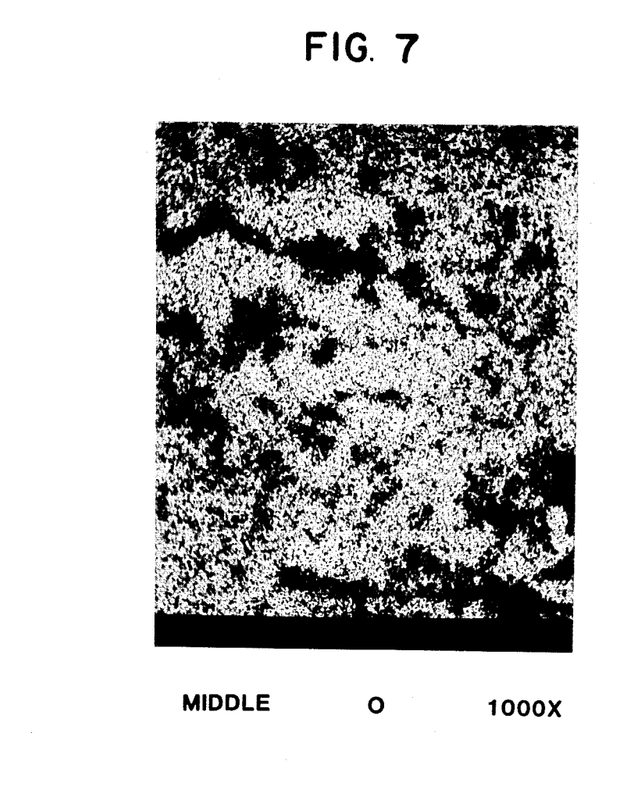
FIG. 7 is an x-ray map corresponding to FIG. 4 at 1000× of a $TiB_2$-$Al_2O_3$ interwoven matrix showing the oxygen concentrations.
Figure 8:
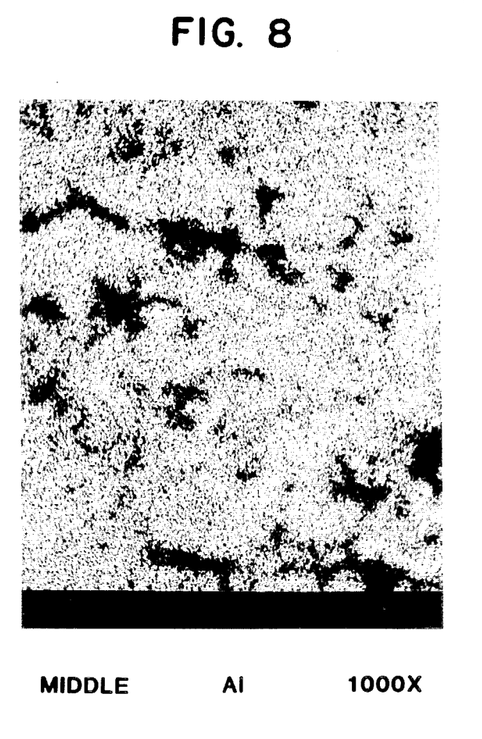
FIG. 8 is an x-ray map corresponding to FIG. 4 at 1000× of a $TiB_2$-$Al_2O_3$ interwoven matrix showing the aluminum concentrations.
Figure 9:
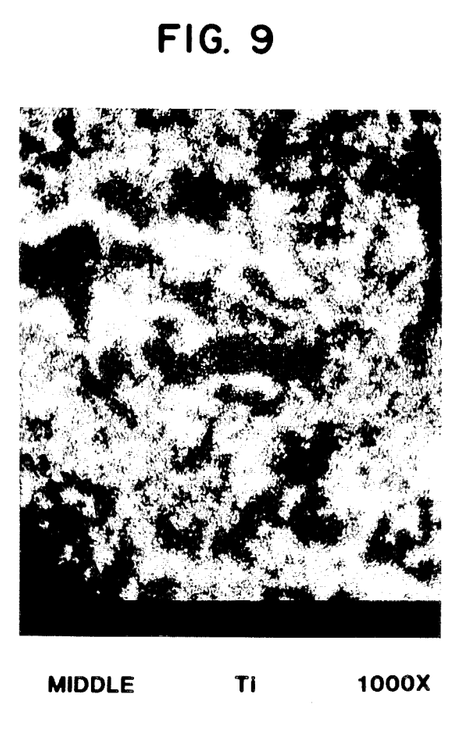
FIG. 9 is an x-ray map corresponding to FIG. 4 at 1000× of a $TiB_2$-$Al_2O_3$ interwoven matrix showing the titanium concentrations.

Referring to FIGS. 4 and 5, there is shown a back-scattered electron image and an optical micrograph from a refractory material formed in accordance with one aspect of the present invention, the composition containing 42 mol. % TiB$_2$ and 58 mol. % Al$_2$O$_3$. These figures illustrate the nature of or continuity of the dispersion of refractory hard metal in the interwoven matrix product in accordance with the invention at a magnification of 1000× and 600×, respectively. The light colored area shows the amount of TiB$_2$ in the product. FIGS. 6 through 9 show corresponding B, O$_2$, Al, and Ti containing areas of the resulting interwoven matrix product.

The initial reactants, used to form the above composition, should comprise 15 to 48 mol. % of metals or metal oxides, e.g., titanium or zirconium, oxides of titanium or zirconium, or alumina. In the preferred embodiment, the reactants can comprise 15 to 25 mol. % oxides of titanium or zirconium, 18 to 25 mol. % B$_2$O$_3$, 50 to 70 mol. % Al and 0 to 20 mol. % of one or more additional metals or metal compounds, as will be described herein below. The reactants can be initially blended by mixing powders of the reactant and reductants and compacting them to pressures in the range of 5,000 to 40,000 psi. The initial reactants may also be formed into the desired shape, e.g., cathode, by using isostatic pressing techniques well known to those skilled in the art.

In accordance with the invention, the reaction may be initiated by exposing a selected portion, such as an end of the compact, to a temperature sufficient to initiate the exothermic reaction.

Figure 10:
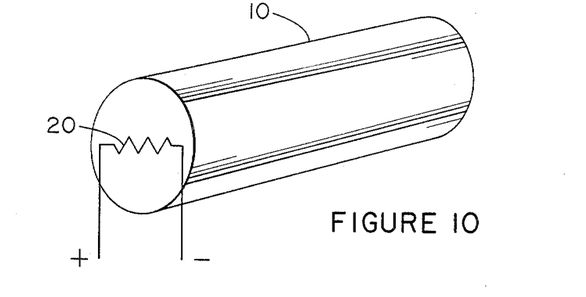
FIG. 10 is an isometric view of the process being locally initiated by a resistance heater.

Turning now to FIG. 10, local initiation of the displacement reaction in formed object 10 may comprise the use of heat energy from a resistance heater 20 which, conveniently, may be placed in contact, or at least in proximity, with one end of object 10. The exothermic heat, generated as the reaction commences, serves to propagate the reaction through the remainder of the formed object.

Figure 11:
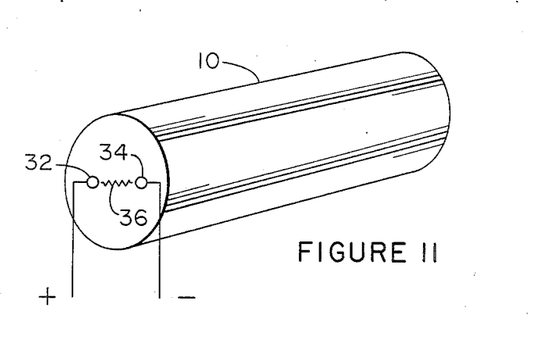
FIG. 11 is an isometric view of the process being locally initiated by a spark ignition source.

Alternatively, as shown in FIG. 11, electrodes 32 and 34, placed adjacent formed object 10, may be spaced sufficiently close together, e.g., 0.035 inch apart, and enegized by a sufficiently high voltage, e.g., 10–20

KEV, to cause a spark 36 to propagate across the electrodes to initiate the reaction.

Figure 12:
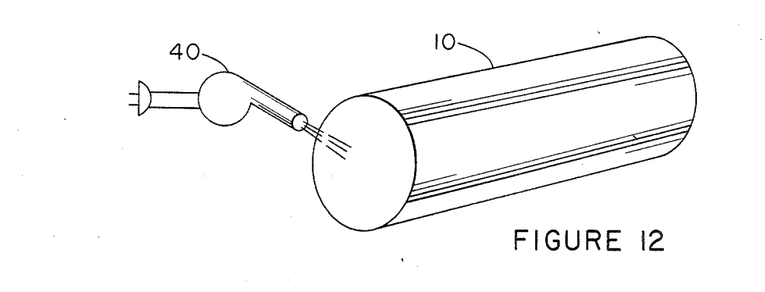
FIG. 12 is an isometric view of the process being locally initiated by a source of heated gas.

The heat to locally initiate the reaction may also be supplied by directing a source of heated gas 40, e.g., hot air, at the formed object as shown in FIG. 12. While hot gas source 40 is shown directed to one end of formed object 10, it will be appreciated that this form of energy may be locally supplied to almost any portion of the formed object with relative ease.

Figure 13:
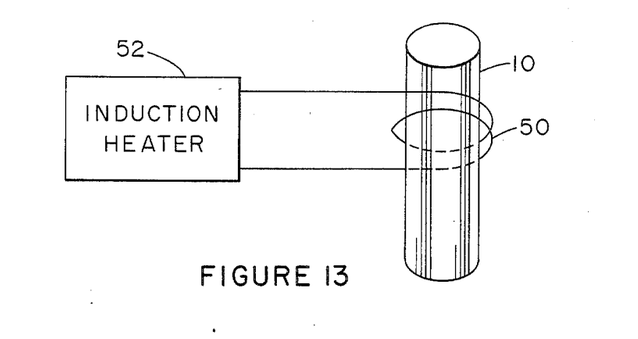
FIG. 13 is an isometric view of the process being locally initiated by an induction heating coil.

Likewise, the use of heat energy from an inductive coil 50 powered by induction heater 52, as shown in FIG. 13, may be applied to any portion of the formed object to initiate the displacement reaction which then propagates through the remainder of the body via the generated exothermic heat.

Figure 14:
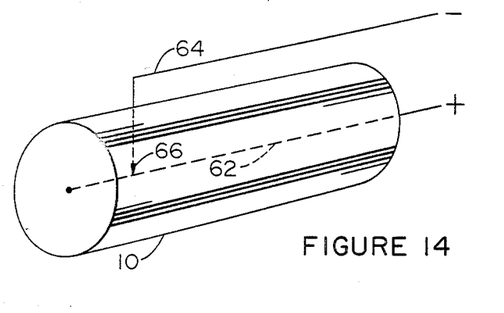
FIG. 14 is an isometric view of the process being locally initiated by a resistance between a probe and a wire embedded in the formed body.

In another embodiment, as shown in FIG. 14, initiation of the reaction may occur, via either a resistance or sparking energy, by forming the shaped object with one electrode 62 buried therein. Preferably, the electrodes are formed from the same metal which comprises the third reactant, i.e., the metal which is oxidized to form the metal compound in the interwoven matrix. In any event, after formation of shaped body 10 with electrode 62 therein, a second electrode 64 is inserted into the body at a selected region where it is desired to initiate the reaction. Electrode 64 is inserted into formed body 10 a sufficient distance to either touch electrode 62 via probe 66, or come to within close proximity of electrode 62. The electrodes are then energized to provide the localized heat to initiate the reaction.

The degree of insertion may vary depending upon the type of energization to be used. For example, as probe 66 on the end of electrode 64 is inserted into formed body 10, the resistance between electrodes 62 and 64 may be monitored. For a spark ignition, electrode 64 is inserted until the resistance falls away completely, indicating that probe 66 has contacted electrode 62. Electrode 64 is then retracted a sufficient distance, e.g., 0.035 inch, to provide the desired spark gap prior to energizing the electrodes. If resistance heating is to be used, probe 66 may comprise a suitable resistance so that when brought into contact with electrode 62 and then energized, the heat from the resistance in probe 66 will initiate the reaction.

Figure 15:
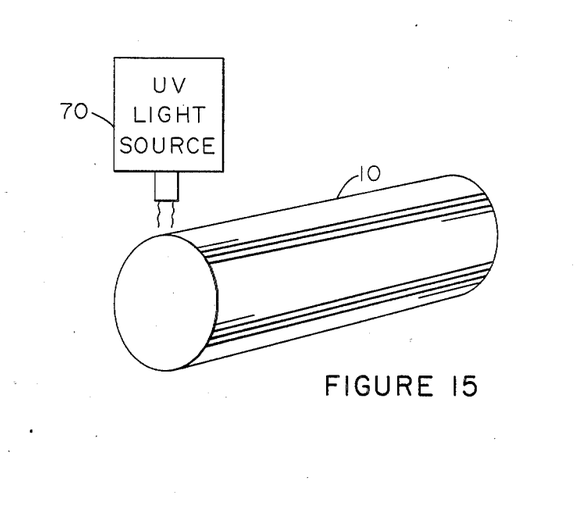
FIG. 15 is an isometric view of the process being locally initiated by an ultraviolet light source.

Other sources of energy may be used to locally initiate the reaction, such as the UV light source 70 of FIG. 15.

It should be further noted that it is within the contemplation of the invention to use additional heat, supplied to the entire body, to supplement the locally generated exothermic heat, if necessary. This may be particularly important if the particular reactants do not generate sufficient exothermic heat to sustain the displacement reaction, or if additional non-reactants, e.g., previously formed TiB$_2$ or ZrB$_2$ are mixed with the reactants.

Preferably, however, the reactants are chosen to avoid the need for such supplemental heat needs since a principal advantage of the present invention is to eliminate or at least severely curtail the need for supplying additional and costly heating. Furthermore, by relying solely on exothermic heat, the entire process is speeded up since the time for residual cooling of a large furnace containing the entire formed object is eliminated.

Furthermore, particularly in some instances where complicated shapes are used, the reaction and reaction temperatures may be more uniform since the internal propagation and heat generation may be more uniform than if an external heat source was used to heat the entire body which can result in hotter areas adjacent the outer surface of the formed object due to the supplemental effect of the external heat and exothermic heat which may, at least initially, not be present in portions of the shaped object more remote from the surface.

It will be appreciated that TiB$_2$ or ZrB$_2$ are electrical conductors and the Al$_2$O$_3$ is an electrical insulator which have been successfully combined to produce a highly electrically conductive material resistant to molten metal, for example.

In another embodiment, the reactants may be hot pressed to form the electrode while locally initiating the reaction as just described. In this embodiment, the powdered initial reactants are uniaxially pressed at a pressure of about 1,000 to 25,000 psi, for example, for about 15 minutes to one hour while the reaction is initiated. This pressure is then continued until the reaction is completed. Care must be exercised in the practice of this embodiment in the selection of die materials which will be inert to the reaction taking place within the dies during the formation of the shaped object. It should be further noted here that hot isostatic pressing can also be used in this embodiment.

As mentioned above, additional metal compounds, such as additional metal oxides and reaction products, e.g., TiB$_2$ or ZrB$_2$, may be added to the original reactants, if desired, to alter some of the chemical, electrical, or structural characteristics, e.g., density, of the resultant product. For example, the addition of at least 3 wt. %, and preferably 20 wt. %, of previously formed TiB$_2$ to the reactants has been found to control the reaction to an extent which provides desired or controlled shapes. However, it will be appreciated that the amount of, for example, TiB$_2$ or ZrB$_2$ which may be added without any detrimental effects is limited by the amount of exothermic heat needed to sustain propagation of the reaction through the remainder of the formed object. If too much of the reaction product, e.g., TiB$_2$ or ZrB$_2$, is added, insufficient heat may be exothermically generated to sustain propagation of the reaction throughout the formed object.

Combinations of the reaction products may be added to the reactants, as noted herein. For example, reaction products, such as an interwoven matrix of TiN-Al$_2$O$_3$ may be added. High temperature refractories containing TiN and Al$_2$O$_3$ may be fabricated in accordance with the following reaction:

$$3TiO_2 + 4Al + 3N \rightarrow 3TiN + 2Al_2O_3$$

Of course, the levels of TiN (titanium nitride) or Al$_2$O$_3$ in the reaction product can be varied depending on the amount of each or both mixed in with the initial reactants, as noted herein with respect to the TiB$_2$-Al$_2$O$_3$ product.

Similarly, other refractory hard metals may be added to the reactants in the same way as TiB$_2$ or ZrB$_2$. Examples of other such refractory hard metals are set forth in a publication entitled "Inert Cathodes and Anodes for Aluminum Electrolysis" by K. Billenhaug and H. A. Oye published by Aluminum Verlag GmbH, Dusseldorf, West Germany, 1981, incorporated herein by reference. When the first reactant contains titanium, preferred refractory hard metals to be added with the reactants include TiN and TiC, as well as TiB$_2$ noted above. In certain instances, combinations of refractory hard metals may be added. It will be appreciated that other refractory hard metals-metal compounds in the form of interwoven products may be formed by this technique, e.g., conductors and insulators.

When $TiO_2$ or $ZrO_2$ is reacted with $B_2O_3$ and Al, it has been found that the resultant composition provides a satisfactory cathode having excellent electrical and mechanical properties in an electrolytic cell. However, the addition of one or more other metals such as, for example, Fe, Ni, Al, Mg, Ca, Co, Si, Sn, Ti, Cr, Mn, W, Nb, Ta, Zr, Cu, Li, and Y; or the oxides thereof; to the reactants can provide the resultant composition having refractory hard metals interwoven therein with an improved density and greater control over electrical or thermal conductivity levels or other physical properties as well as inertness of the resultant compounds to corrosive environment. With respect to density, for example, it will be found that the addition of about 3 wt. % Fe to the reactants to form $TiB_2$-$Al_2O_3$ matrix can increase the density from 10 to 70%.

In another aspect of the invention, to the reactants, e.g., $TiO_2$ or $ZrO_2$, $B_2O_3$, and Al can be added oxide compounds preferably more stable than $Al_2O_3$. For example, CaO can be added in the proper proportion to the reactants to form calcium aluminates ($CaAl_2O_4$). Other oxides that may be added include MgO, BaO, BeO, $Li_2O$, and $Na_2O$. The addition of CaO, for example, permits the formation of a low melting slag which may result in enhanced separation of $TiB_2$ therefrom. Other benefits, depending on the reactants, can be improved densification of the interwoven matrix product.

While reference has been made herein to the use of the interwoven matrix composition as a cathode, in the conventional form, its use is not limited thereto. For example, the interwoven matrix refractory may be used in the form of a packed bed of bodies of the reaction product for the cathode, as shown in FIG. 2. That is, in another aspect of the invention, there is placed on the floor 15 of the cell, in the region of the body of molten aluminum, a bed of objects 16. Interstices between the objects accommodate molten aluminum. The bed exerts a damping effect on movement of aluminum and reduces wave amplitudes in the body.

The following example is still further illustrative of the invention.

EXAMPLE

A mixture comprised of 1 mole $TiO_2$, 1 mole $B_2O_3$, and 3.334 moles of aluminum powders were blended together. $TiO_2$ was obtained from Atomergic Chemical Company, Lot D3030, purity 99.95%: $B_2O_3$ (anhydrous boron oxide) was obtained from Fisher Scientific Company, No. A76, Lot #792782; aluminum powder was Alcoa atomized powder with approximately 30% below 325 mesh (Tyler series); $TiO_2$ and $B_2O_3$ were less than 48 mesh (Tyler series). 100 gm of the above composition was mixed for one hour to provide a homogeneous composition. Samples of the composition were pressed in a mold to provide a green density of approximately 1.8–2.2 gms/cc, the samples being about ½ inch in diameter and 1.2 inch long. The reaction was initiated by heating the sample by a resistance wire through which 50 amps of current was allowed to flow.

After the reaction was completed, the samples were analyzed by x-ray. Analysis showed that $TiB_2$ and $Al_2O_3$ were the phases present in the sample. The samples were highly electrically conducting and were found to be readily wetted by molten aluminum and suitable for use as cathode material in Hall cells for production of aluminum. The density of the sample produced was approximately 1.8 gms/cc. The product had a layered and lacey structure and did not retain its original shape. $TiB_2$ and $Al_2O_3$ formed an interwoven network matrix, as is seen or evidenced by FIGS. 4–9.

While the invention has been described in terms of preferred embodiments, the claims appended hereto are intended to encompass other embodiments which fall within the spirit of the invention.

What is claimed is:

1. In a process wherein a first reactant comprising one or more metals or metal compounds exothermically reacts with at least one or more metals or metal compounds in the presence of a third reactant to form a substantially interwoven matrix of a conductive material and an insulating material; the improvement which comprises locally applying, to a selected region of a shaped body formed from a mixture of said reactants, sufficient energy to initiate said exothermic reaction which propagates throughout the remainder of said body to form said interwoven matrix.

2. The process of claim 1 including the additional step of adding to said mixture of reactants a previously reacted conductive material in an amount, not less than 3 wt. % nor exceeding 20 wt. %, which will be sufficient to inhibit the generation of excessive exothermic heat without inhibiting propagation of the exothermic reaction throughout the mixture.

3. The process of claim 2 wherein said previously reacted material is selected from the class consisting of $TiB_2$ and $ZrB_2$.

4. The process of claim 2 wherein said step of locally applying energy comprises locally applying heat energy to initiate said reaction.

5. The process of claim 4 wherein said step of locally applying heat energy comprises energizing a resistance heater in thermal proximity to said selected region in said body.

6. The process of claim 4 wherein said step of locally applying energy comprises directing a stream of a gas at an elevated temperature toward said selected region in said body.

7. The process of claim 4 wherein said step of locally applying energy comprises providing an ignition spark adjacent said selected region in said body.

8. The process of claim 7 wherein said step of providing an ignition spark further comprises placing two spaced apart electrodes adjacent said selected region and providing a sufficient electrical potential between said electrodes to cause an ignition spark to occur to initiate said invention.

9. The process of claim 4 wherein said step of locally applying heat energy comprises supplying heat energy from an induction heater adjacent said selected region of said body.

10. The process of claim 2 which further comprises the step of directing a sufficient amount of ultraviolet light energy at said selected region to initiate said reaction.

11. The process of claim 2 including the further steps of forming a body from said reactants having a conductive electrode therein; contacting said body with a second electrode in said selected region; and providing a sufficient energy potential between said electrodes to initiate said reaction in said preselected region.

12. The process of claim 11 including the further step of passing said second electrode into said body a sufficient distance with respect to said conductive electrode therein to permit initiation of said reaction by placing a sufficient potential between said electrodes.

13. An improved process for producing a ceramic composite comprising a substantially interwoven matrix of a first material and a second material, the process comprising the steps of:
 (a) forming a body containing first and second reactants capable of exothermically reacting to form said first material and a third reactant capable of oxidizing to form said second material; and
 (b) locally applying sufficient energy to a first region of said body to initiate a self propagating exothermic reaction which propagates throughout the remainder of said body in order to reduce said first and second reactants and oxidize said third reactant to form said composite of said first material and said second material.

14. The process of claim 13 which includes the further step of adding previously reacted amounts of said first material to the reactant mixture in an amount insufficient to lower the amount of exothermic heat generated sufficiently to interfere with the propagation of the reaction but sufficient to prevent distortion of said composite by the generation of excessive exothermic heat.

15. The process of claim 14 wherein said first material comprises a conductive material which forms an interwoven matrix with said second material which comprises an insulating material.

16. The process of claim 14 wherein said step of locally applying sufficient energy to a first region comprises locally applying heat energy to said first region.

17. The process of claim 14 wherein said first reactant is selected from the class consisting of a titanium compound, a zirconium compound, or mixtures thereof.

18. The process of claim 14 wherein said second reactant is a boron compound.

19. The process of claim 14 wherein said third reactant is a metal capable of reacting with said first and second reactants to form an insulating compound which forms a substantially interwoven matrix with a conductive material formed from said first and second reactants.

20. The process of claim 19 wherein said first reactant is selected from the class consisting of a titanium compound, a zirconium compound, or mixtures thereof; said second compound comprises a boron compound; and said first and second reactants react with said third reactant to form a substantially interwoven matrix of a refractory hard metal and an insulating material.

21. The process of claim 20 wherein said third reactant is aluminum and said reactants react by a displacement reaction to form a substantially interwoven matrix of a refractory hard metal and aluminum oxide.

22. An improved process for producing a ceramic composite comprising a substantially interwoven matrix of a first material selected from the class consisting of $TiB_2$ and $ZrB_2$ and a second material consisting essentially of $Al_2O_3$, the process comprising the steps of:
 (a) forming a body from a mixture containing:
  (1) 15 to 25 mol. % of a first reactant selected from the class consisting of titanium, an oxide of titanium, zirconium, and an oxide of zirconium;
  (2) 18 to 25 mol. % $B_2O_3$; and
  (3) 50 to 70 mol. % aluminum; and
 (b) locally applying sufficient energy to a first region of said body to initiate a self propagating exothermic reaction which propagates throughout the remainder of said body in order to form said first material by the reduction of said first reactant and said $B_2O_3$ and to form said second material by the oxidation of said aluminum to form said composite of said first material and said second material.

23. The process of claim 22 including the further step of adding to said mixture a sufficient amount of previously formed $TiB_2$ or $ZrO_2$ to control the exothermic heat generated by formation of said interwoven matrix of said first and second materials to prevent generation of excessive heat without interfering with the self propagation of said exothermic reaction.

* * * * *